I. KITSEE.
ELECTRIC BATTERY.
APPLICATION FILED OCT. 15, 1906.
901,012.
Patented Oct. 13, 1908.
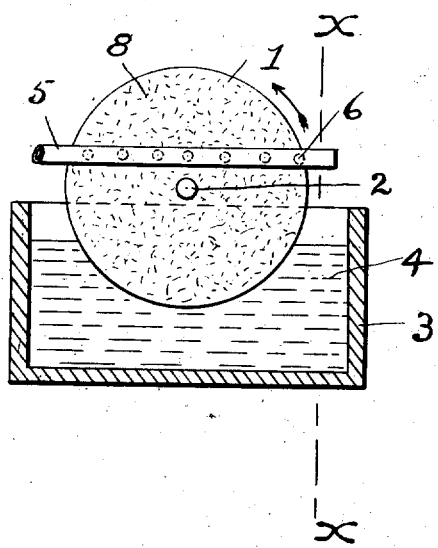
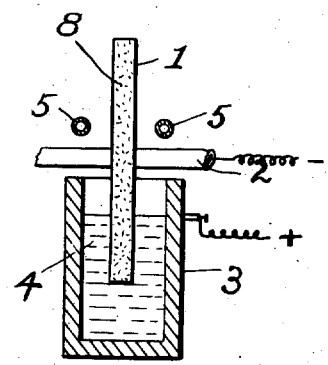
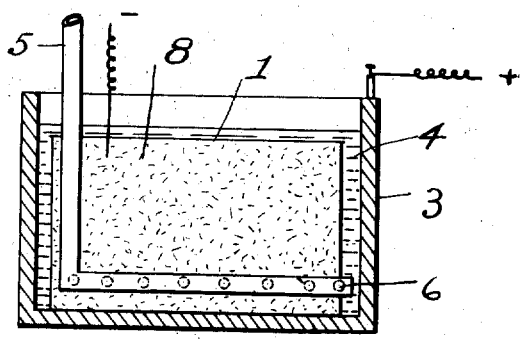
Witnesses
Edith P. Stilley
Mary E. Smith

UNITED STATES PATENT OFFICE.

ISIDOR KITSEE, OF PHILADELPHIA, PENNSYLVANIA.

ELECTRIC BATTERY.

No. 901,012.  Specification of Letters Patent.  Patented Oct. 13, 1908.

Application filed October 15, 1906. Serial No. 339,095.

*To all whom it may concern:*

Be it known that I, ISIDOR KITSEE, citizen of the United States, residing at Philadelphia, in the county of Philadelphia and State of Pennsylvania, have invented certain new and useful Improvements in Electric Batteries, of which the following is a specification.

My invention relates to an improvement in electric batteries.

It has more special reference to the electro-negative or carbon element. As is well known, the greatest difficulty in the employment of primary cells lies in the depolarization of the electro-negative element, and it is the aim of my invention to provide such cells with means whereby the depolarization of this element can be effected in a simple and efficient manner.

I make use of the catalytic action of such substances as platinum black. But when an electrode provided with such substances is immersed in the electrolyte, the catalytic action decreases after a short period of work, for the reason that the electrolyte contains only a very limited amount of free air, and the oxygen of the air is a necessary medium for the catalytic action. To provide this necessary air in conjunction with the material adapted to concentrate the same, my invention consists of the arrangements and devices, as will hereinafter be described, illustrated in the drawing and more clearly defined in the claims following this specification.

Referring to the drawing, Figure 1 is a section of a retaining vessel with the electro-negative element in the shape of a rotating disk. This element is provided with platinum black on its surface as well as in its pores. Fig. 2 is a section on the line X X of Fig. 1. Fig. 3 is a section of a retaining vessel and an elevation of the electrode and means to convey the air.

In Fig. 1, 3 is the containing vessel; 4 the electrolyte therein.

1 is the electro-negative element, here shown as a carbon disk; 8 the platinum black; 5 and 6 the means to impart on the surface of this disk a blast of air. These means are shown here as a pipe 5 provided with the orifices 6. The carbon is centered at 2 and is supposed to rotate in the direction of the arrow.

In Fig. 3, the carbon is stationary and the pipe 5 is immersed in the electrolyte. As illustrated on the drawing, it is best to provide each side of the carbon with means to furnish the necessary air for the catalytic action.

The operation of the device, as illustrated in Fig. 1, is as follows: The disk is revolved by suitable means, the lower portion of the disk being immersed in the liquid and the upper portion of the disk being in close proximity to the air pipe 5. With the aid of fans or other similar means, fresh air is continuously blown into the pipe and will then issue from the orifices and be impacted on the platinum black.

The operation of the device, as illustrated in Fig. 3, is simply the following: A blast of air is continuously driven through the pipe 5. This air will issue from the orifices 6 and will be impacted on the carbon and then rise to the surface of the electrolyte, but will be able to impart to the whole platinized surface, the necessary fresh air.

While the drawings illustrate the vessel or cell 3 as the electro-positive element, it will be understood that such illustration is only conventional, and is adopted in the present instance merely to differentiate the electro-negative and the electro-positive elements, but in no sense is such illustration for purposes of limitation or restriction of the invention.

Having now described my invention, what I claim as new and desire to secure by Letters Patent is:

1. The method of depolarizing an electrode provided with a catalytic substance, which consists in impinging a jet of fluid thereon when out of contact with the electrolyte, whereby oxygen is imparted to said electrode.

2. The method of depolarizing an electrode impregnated with a catalytic substance, which consists in impinging a jet of fluid thereon when out of contact with the electrolyte, whereby oxygen is imparted to said electrode.

3. The method of depolarizing an electrode provided with a catalytic substance, which consists in impinging a jet of an oxidizing agent thereon when out of contact with the electrolyte, whereby continued catalytic action of said substance is permitted.

4. The method of depolarizing an electrode provided with a catalytic substance, which consists in impinging a jet of air thereon when out of contact with the electrolyte, whereby continued catalytic action of said substance is permitted.

5. The method of depolarizing an electrode provided with platinum black, which consists in impinging a jet of air thereon when out of contact with the electrolyte, whereby continued catalytic action of said platinum black is permitted.

6. The method of depolarizing a rotatable electrode provided with platinum black, which consists in impinging a jet of an oxidizing agent upon that portion of the electrode out of contact with the electrolyte, whereby continued catalytic action of said platinum black is permitted.

7. The method of depolarizing a rotatable electrode provided with platinum black, which consists in impinging a jet of air upon that portion of the electrode out of contact with the electrolyte, whereby continued catalytic action of said platinum black is permitted.

In testimony whereof I affix my signature in presence of two witnesses.

ISIDOR KITSEE.

Witnesses:
MARY C. SMITH,
ALVAH RITTENHOUSE